United States Patent [19]

Hill

[11] Patent Number: 4,836,609

[45] Date of Patent: Jun. 6, 1989

[54] VEHICLE SEAT

[75] Inventor: Kevin E. Hill, Milwaukee, Wis.

[73] Assignee: Milsco Manufacturing Company, Milwaukee, Wis.

[21] Appl. No.: 182,906

[22] Filed: Apr. 18, 1988

[51] Int. Cl.[4] ............................................. A47C 7/02
[52] U.S. Cl. .................................. 297/452; 297/218; 297/455
[58] Field of Search ................... 5/402, 403, 404, 405, 5/406; 297/218, 452, 455, DIG. 1; 160/380

[56] References Cited

U.S. PATENT DOCUMENTS

| | | | |
|---|---|---|---|
| 3,223,450 | 12/1965 | Pollock | 5/403 |
| 3,758,159 | 9/1973 | Morris | 297/455 |
| 3,788,701 | 1/1974 | Massaccesi | 297/455 |
| 3,823,980 | 7/1974 | Harnick | 297/455 |
| 3,904,242 | 9/1975 | Koepke et al. | 5/402 |
| 4,018,479 | 4/1977 | Ball | 297/455 |
| 4,465,534 | 8/1984 | Zelkowitz | 297/218 |
| 4,561,621 | 12/1985 | Hill | 297/328 |

Primary Examiner—Kenneth J. Dorner
Assistant Examiner—Brian K. Green
Attorney, Agent, or Firm—James E. Nilles; Donald C. McGaughey

[57] ABSTRACT

A seat assembly for use on a vehicle which comprises a seat pan having seat and backrest portions and a contoured edge. An inner support ring is provided that has a periphery to match the contoured edge, and an interior surface and an outer surface. Seat and backrest cushions are supported by the seat pan and have an outer margin secured to the interior surface of the support ring. A channel shaped finishing strip is mounted on the contoured edge. An upholstery covers the cushion and has a selvage edge that extends beyond the cushion to lay between the outer surface of the support ring and the contoured edge of the seat pan. A mounted means secures the support ring to the seat pan to lock both the selvage edge and the channel shaped finishing strip in place between the support ring and the contoured edge.

15 Claims, 3 Drawing Sheets

VEHICLE SEAT

BACKGROUND OF THE INVENTION

1. Field of the Invention

This invention relates generally to a vehicle seat and more particularly to a seat for use on tractors that has an improved structure for holding the seat upholstery cover and a protective channel shaped finishing strip onto the edge of a seat pan shell.

2. Description of the Prior Art

U.S. Pat. No. 4,561,621, issued Dec. 31, 1985 to Kevin E. Hill, discloses a typical seat assembly which includes a rigid metal seat pan formed to provide seat and backrest portions. A shaped seat and backrest cushion of resilient material is fixed upon the seat pan and fabric upholstery cover is placed over the cushion. The fabric is secured to the edge of the seat pan by a channel shaped finishing strip that is placed over both the edge and the fabric and crimped in place. In the prior art structure, the fabric and channel shaped strip are held in place on the pan by friction between the channel and the surface adjacent the edge of the seat pan.

While this type of prior art seat structure will generally perform satisfactorily, problems can arise under certain use conditions. Tractor seats, for example, are normally subjected to rigorous use and some operators may repeatedly grasp the edge of the seat pan with their hand or hands and then pull to assist themselves in mounting and dismounting the tractor.

This pulling can concentrate extremely high lateral forces on portions of the channel shaped strip that are gripped and result in the strip being pulled off of the seat pan edge. Further, the channel shaped strip is usually bent or otherwise damaged as it is pulled off and cannot be reinstalled. If the channel shaped strip is not replaced, the fabric edge, even if cemented down, will ultimately come loose. Further, with the channel shaped strip removed, the sharp hostile edge of the seat pan is exposed with a potential to injure the seat user. Also, the fabric is free to pull away from the seat cushion to expose the foam or sponge rubber core, which is fragile, and subject to wear and deterioration.

A further problem is that of possible penetration of water into the interface between the cushion and the seat pan. Such water can cause the seat pan to rust if it is made of steel. Further, undue amounts of water can make the seat cushion soggy and possibly cause discomfort to the seat occupant.

When the seat is occupied by unusually large sized persons, prior art seat cushions do not provide as much lateral support and reenforcement for the outer margin of the seat cushion as desired. The formed sides of the seat pan provide some of the lateral or side support. Consequently, the outer margin of the cushion may compress down against the peripheral edge of the seat pan. Such compression can subject the upholstery to sharp folding which shortens its life, especially when vinyl is used, and, further, the peripheral edge of the seat pan is likely to concentrate more pressure to specific body portions in contact therewith than is desired resulting in possible discomfort after sitting in the seat for long periods of time. In the prior art it is known to avoid concentration of pressure on body portions by using oversized, thick, deeply cushioned seats. Such oversized cushions increase the amount of material used and thus significantly increase both the seat cost and its size.

It is possible to secure the channel shaped finishing strip to the seat pan by using closely spaced rivets. This method is labor intensive and costly. Further, it is possible for the heads of the rivets to not be completely seated which can result in the rivet itself presenting a sharp hostile edge.

The problem which has not heretofore been satisfactorily solved is how to provide a compact seat which can be efficiently and correctly assembled with a minimum amount of labor, but which will have provision for quickly and accurately fastening the seat upholstery and a channel shaped seat pan finishing strip to the seat pan in a manner which will minimize the risk that the strip will be pulled loose even when subjected to unreasonable force; which will provide an improved gasket effect to minimize risk of water penetrating between the seat pan and the seat cushion; and which, in addition, will provide lateral body support without the necessity of providing an oversized seat cushion so that the size, weight and cost thereof can be kept to a minimum while still providing comfort and support to the seat occupant.

SUMMARY OF THE INVENTION

The object of the present invention is to provide an improved vehicle seat which can be efficiently and correctly assembled with a minimum amount of time and labor and wherein provision is made for quickly and securely fastening seat upholstery and an associated channel shaped finishing strip to the edge of the seat pan in a manner minimizing risk that the finishing strip will be pulled loose.

Another object of the invention is to provide an improved seat having a finishing strip which will minimize water penetration between the seat pan and seat cushion.

The vehicle seat assembly comprises a seat-pan that has seat and backrest portions, an inwardly directed flange terminating in a contoured edge and an inner surface which is adjacent to the contoured edge. The assembly also includes an inner support ring that has a periphery which matches the contour of the contoured edge. The support ring presents an interior surface, an outer surface in facing relation to the seat pan inner surface, a seat front peripheral portion, a seat backrest top peripheral portion and seat side peripheral portions. The seat assembly is provided with a mounting means for securing the inner support ring onto the seat pan. A seat and backrest cushion means is provided that have central portions supported by the seat pan and an outer margin which is secured to the interior surface of the support ring. An upholstery covers the seat and backrest cushion portions and has a selvage edge that extends beyond the support ring and between the outer surface of the support ring and the inner surface of the seat pan flange edge which preferably is covered by a channel shaped finish strip or bead.

More specifically, the seat pan flange extends inwardly at a first angle and has a channel shaped finishing strip mounted on the contoured edge thereof. The inner support ring has a main portion which extends inwardly coextensively with and in spaced parallel relation to the flange, and the support ring also has a lock rim portion that flares outwardly at a second angle toward the contoured edge to lock both the selvage edge and the channel shaped strip between the lock rim portion and the contoured edge of the seat pan.

The invention also includes a mounting means for securing the inner support ring to the seat pan which includes a plurality of tabs at spaced intervals along the periphery of the inner support ring which extend inwardly toward the central regions of the back and seat supporting portions. The seat pan has a plurality of corresponding lances on the seat pan backrest and seat supporting portions which function as a guide means for the tabs. Each of the lances are in alignment with one of the inner ring tabs and are cooperatively engageable therewith when the seat is assembled to align the inner support ring and its associated seat and backrest cushions on the seat pan. More specifically, the plurality of tabs includes two spaced apart tabs on the inner support ring front peripheral portion and two spaced apart tabs on the inner support ring backrest top peripheral portion. The mounting means may also include a plurality of mounting bosses on the inner support ring and releasable fastening means which extend through the seat pan and into the mounting bosses. Preferably, the plurality of bosses includes at least one mounting boss on each of said seat peripheral side portions of the inner support ring.

Preferably, the channel shaped finish strip is adapted to improve its gasket and gripping functions to minimize risk of water penetration between the seat pan and seat cushion.

In another embodiment of the invention, the mounting means does not include any lances and only includes mounting bosses on the top, front and side peripheral portions of the inner support ring and releasable fastening means which extend through the seat pan and into the mounting bosses.

In a further embodiment of the invention, neither the tabs nor the mounting bosses are used and instead the mounting means is provided by a hook and loop fastening means which is secured between the seat pan inner surface and the support ring outer surface.

In a further embodiment of the invention, the support ring or mounting pads thereon could be secured to the seat pan by an adhesive only. In all embodiments, the inner support ring is designed so that when the seat is in an installed position, the lock rim will have a top peripheral portion flaring in a generally vertical direction which cooperates with a vertical part of the seat pan to provide a bolster for supporting the outer margin of the back cushion adjacent thereto and, in addition, the lock rim front peripheral portion will flare in a generally horizontal direction to provide a bolster for the outer margin of the seat cushion that is adjacent thereto. Preferably, the lock rim bolster will extend around the entire inner support ring periphery to support the entire outer margin of the seat cushion.

DESCRIPTION OF THE PREFERRED EMBODIMENTS

Figure 1:
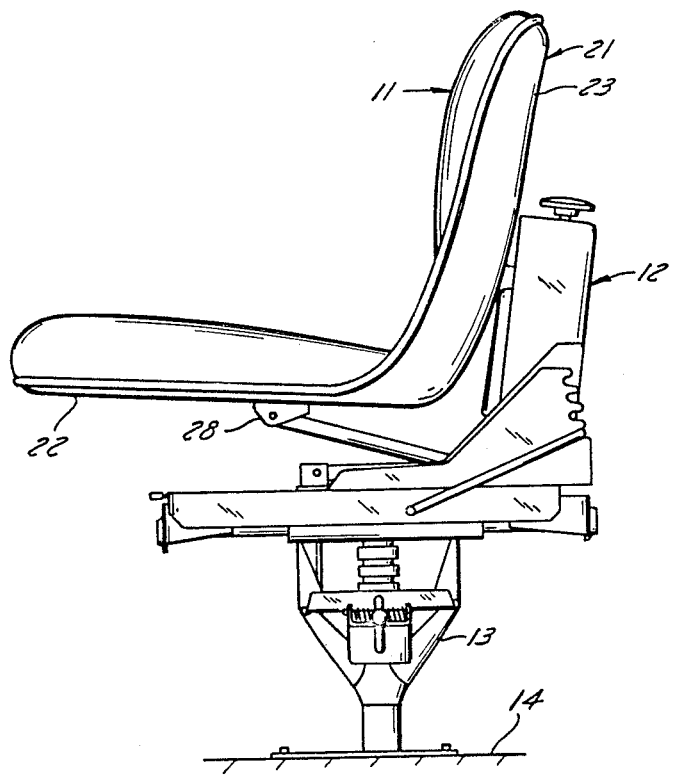
FIG. 1 is a side elevational view of the seat assembly mounted on a pedestal support by means of a suspension mechanism which forms no part of the present invention.

Referring to FIGS. 1–7, a seat assembly 11 is shown therein. The seat assembly 11 is supported by a suspension mechanism 12 which permits the seat assembly to be adjusted to a plurality of different positions and locked in such positions. The suspension mechanism 12 is carried by a pedestal support 13 mounted on the floor 14 of a vehicle. As the suspension mechanism, pedestal support, and vehicle itself comprise no part 1 of the present invention, no further description of these components will be made.

Figure 3:
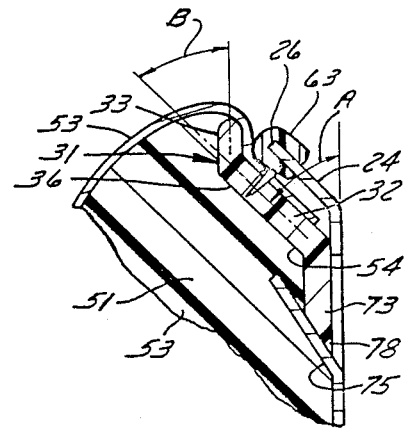
FIG. 3 is an enlarged showing of the sectional view of the top portion of the backrest of the seat assembly shown in FIG. 2.
Figure 4:
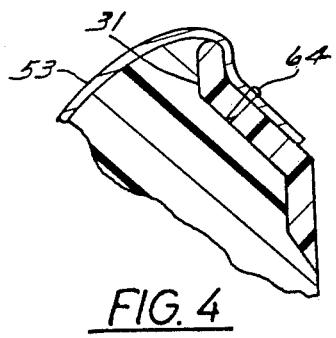
FIG. 4 an enlarged showing of the sectional view of the top portion of the seat shown in FIG. 2 with the upper portions of the seat pan eliminated for purposes of clarity.
Figure 2:
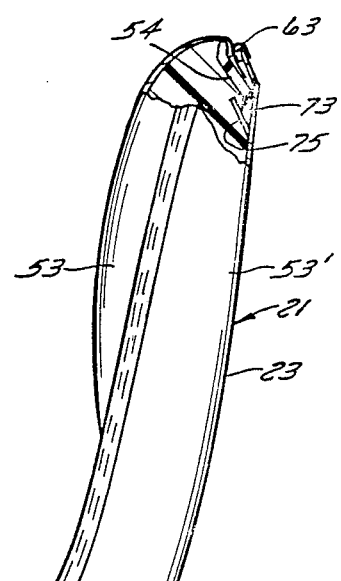
FIG. 2 is a side elevational view of the seat assembly shown in FIG. 1 with portions broken away and shown in section.
Figure 5:
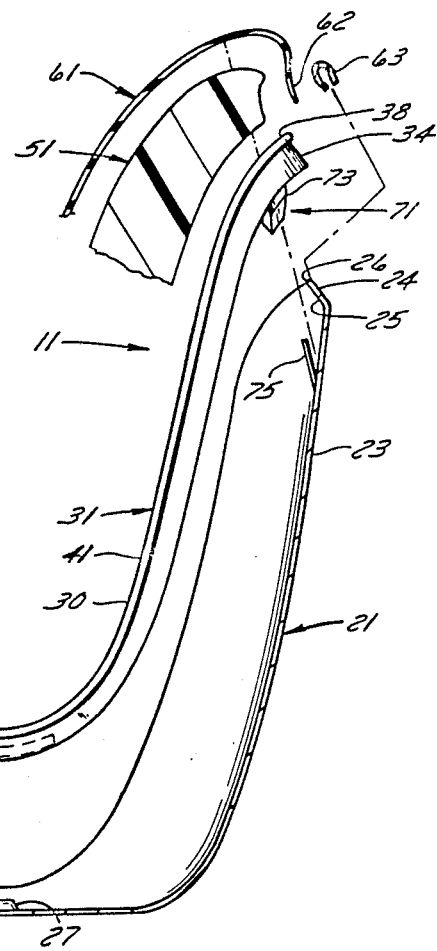
FIG. 5 is an exploded view showing the components of the seat assembly and side elevation with some components only partially shown.
Figure 5:
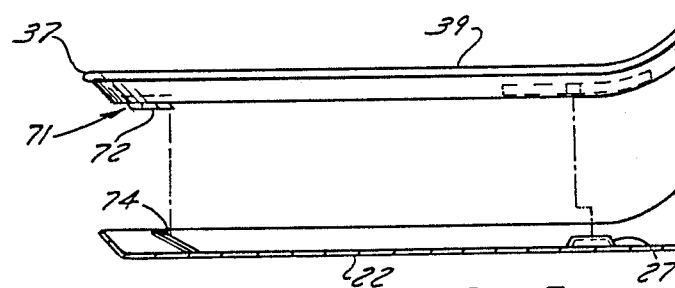

With reference to FIGS. 2, 3 and 5, the seat assembly 11 comprises a seat pan shell 21, an inner support ring 31, cushions 51, a cushion covering upholstery 61, and a mounting means 71 for securing the inner support ring associated cushions and upholstery onto the seat pan 21.

The seat pan 21 is preferably stamped from a sheet of rigid sheet metal and formed thereby to provide a seat portion 22 and a backrest portion 23. The seat and backrest portions 22, 23 have central portions 22', 23' respectively. The seat pan includes an inwardly directed flange 24 which terminates in a contoured edge 26. The seat pan 21 has an inner surface 25 adjacent the contoured edge 26. In the embodiment shown in FIGS. 1–7, the mounting means 71 includes a pair of mounting recesses 27 in the seat pan portion 22, only one of which appears in FIG. 2, and laterally spaced apart pairs of lower and upper lance guide means 74, 75. The recesses 27 are provided with apertures to receive cap screws 77 therethrough. The upper and lower tab guide means 74, 75 are formed by stamping out rectangular lances in the seat pan 21. The lances are bent inwardly at an acute angle relative to the plane in which the seat pan bottom and backrest portions lie. The function of the lower and upper tab guide means 74, 75 and the apertured mounting recess 27 will be further explained hereinafter. The seat pan 21 is also provided with mounting holes, not shown, for securing the upper and lower mounting brackets (only the lower bracket 28 being shown in FIG. 1) of the suspension mechanism 12 thereto.

The seat assembly also includes an inner support ring 31 having a periphery 30 which matches the contour of the contoured edge 26. The inner support ring 31 has an interior surface 36 which faces the cushion 51 as will be more fully explained hereinafter. The inner support ring also includes an outer surface 34 which is in facing relation to the inner surface 25 of the seat pan 21. The inner support ring 31 also includes a front peripheral portion 37, a seat back top peripheral portion 38, horizontal right and left side peripheral portions 39, and vertical right and left side peripheral portions 41.

With specific reference to FIG. 3, the inner support ring 31 has a continuous main portion 32 which extends at an angle A toward the seat pan seat and backrest portions 22 and 23 and coextensively in spaced parallel relation to the inner surface 25 of the seat pan flange 24. The inner support ring 31 also has a lock rim portion 33 which is formed integrally with the main portion 32 and flairs outwardly, at a second angle B, toward the contoured edge 26 of the seat pan. The lock rim portion 33 extends coextensively with the main portion 32 around the entire outer contour of the inner locking ring. The function of the main portion 32 and the lock rim 33 is to securely lock the upholstery selvage edge 62 and an edge finishing means such as channel shaped protective finishing strip or bead 63 securely against the contoured edge 26 as will be more fully explained hereinafter.

Figure 12:
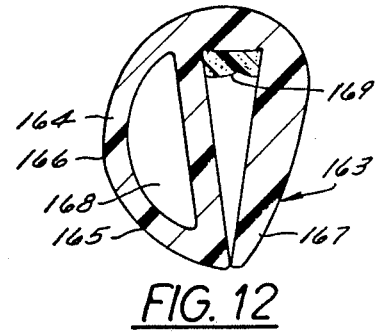
FIG. 12 a sectional view of a modified form of the channel shaped finish strip, for use on the seat pan edge.
Figure 13:
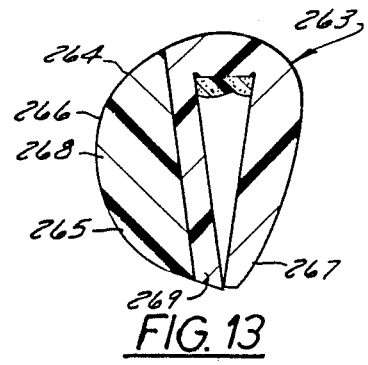
FIG. 13 is a sectional view of another modified form of the channel shaped finish strip for use on the seat pan edge.
Figure 14:
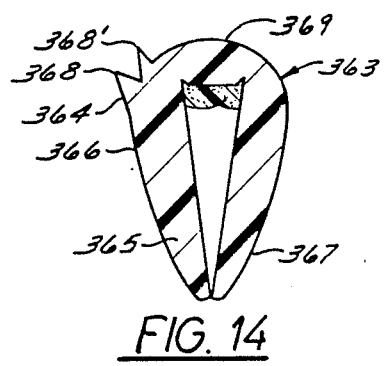
FIG. 14 is a sectional view of an additional modified form of the channel shaped finish strip for use on the seat pan edge.

The channel shaped finish strip may take the form of strip 63 shown in FIGS. 2, 3 and 5 or any one of the modified finish strips 163, 263 or 363 shown in FIGS. 12, 13 and 14, respectively. The surface of strip 63 which is pressed into abutting relation with the upholstery 61 acts as a gasket to minimize water penetration therebetween. The modified strips 163, 263 and 363 are all characterized by an improved gasket means 164 (FIG. 12), 264 (FIG. 13), or 364 (FIG. 14) which present compression surfaces 166, 266 and 366, respectively, in opposed facing relation to the lock rim portion 33. Each of the gasket means will be in a state of compression when the inner support ring 31, cushion 51 and upholstery selvage 62 are assembled on the seat pan 21 to resiliently urge the compression surface (166, 266 or 366) against the upholstery and lock rim. This compression further increases the gasket effect of the finish strip and minimizes the risk of water penetrating between the seat cushion 51 and seat pan 21.

More specifically, the modified finish strip 163 shown in FIG. 12 is U-shaped in section and has an inner leg 165 presenting a compression surface 166 and an outer leg 167. The gasket means 164 includes an air pocket 168 located internally of the inner leg 165 which is compressed when the seat is assembled to resiliently urge the compression surface 166 against the upholstery selvage 62 and lock rim 33.

The modified finish strip 263 shown in FIG. 13 is also U-shaped in section and has an inner leg 265 presenting a compression surface 266 and an outer leg 267. The inner leg includes dual low and high density foam portions 268, 269. The gasket means 264 comprises the low density foam portion 268 which is compressed when the seat is assembled to resiliently urge the compression surface 266 against the upholstery selvage 62 and the lock rim 33.

The modified finish strip 363 shown in FIG. 14 is also U-shaped in section and has an inner leg 365 presenting a compression surface 366 and an outer leg 367. The gasket means comprises at least one resilient ridge 368 located on an upper area of the inner leg adjacent the bight portion 369 which connects the inner and outer legs. Preferably, two ridges 368, 368' are provided and compressed, when the seat is assembled, against the upholstery selvage 62 and the lock rim 33.

In all embodiments it is desirable, but not necessary, that the finish strip include an interior pressure sensitive adhesive bead, as, for example, the adhesive 169 shown in FIG. 12.

Figure 6:
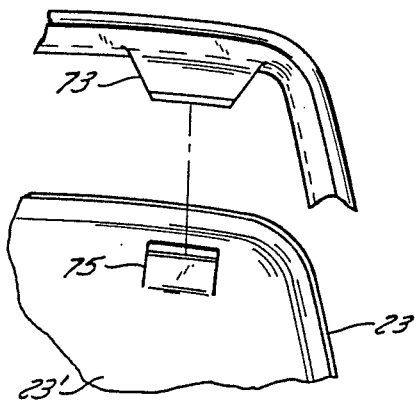
FIG. 6 is a partial rear elevational view of the upper right-hand corner of the seat pan backrest and inner support ring shown in FIG. 5.

The mounting means 71 further includes a plurality of lower and upper tabs 72 and 73, FIGS. 2 and 3, provided at spaced intervals along the inner peripheral edge of the inner support ring 31. The detail of the tab construction is best shown in FIGS. 3 and 6 which shows the upper tab 73 in detail. As each of the tabs are the same in construction, only the tab 73 will be described in detail. In the embodiment of FIGS. 1–7, and specifically FIGS. 3 and 6, the tab 73 projects inwardly toward the central regions of the back and seat supporting portions 22, 23 and is provided with a sharply beveled edge 78. The included angle of the beveled edge 78 matches the acute angle at which upper lance 75 extends inwardly from the seat pan backrest 23.

Figure 7:
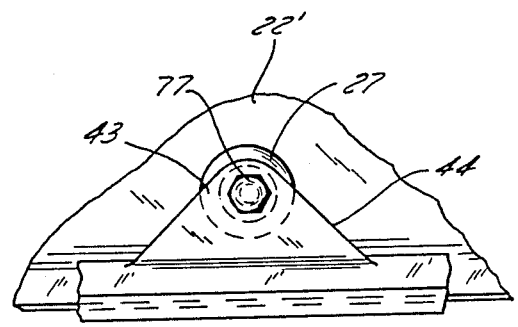
FIG. 7 is a partial bottom elevational view of the seat assembly looking in the direction of line 7—7 of FIG. 2.

In the first embodiment shown in FIGS. 1–7, the inner mounting ring 31 includes mounting bosses 43 (only one of which is shown in FIG. 7) on the right and left horizontal side peripheral portions 39 thereof. The bosses 43 constitute a part of the mounting means 71 for securing the inner support ring 31 onto the seat pan 21 and will be further described hereinafter. The bosses 43 comprise a tab member 44 formed integrally with the inner support ring 31 to extend inwardly towards the central portion 22' of the seat pan or, if desired, the ring 31 could be made slightly wider to provide an inwardly extending flange into which a releasable fastener such as cap screw 77 is secured.

The cushion member 51 includes a seat cushion 52 and backrest cushion 53, each of which has a central portion 52', 53', respectively, supported by the seat pan seat and backrest portions 22, 23. The seat and backrest cushions have an outer margin 54 which is secured to the interior surface 36 of the interior support ring 31. Preferably, the seat and backrest cushions 52, 53 are formed in place on the inner support ring 31, although the cushions could be formed separate and secured to the interior surface 36 by any suitable means such as an adhesive.

An upholstery 61, such as vinyl fabric, covers the seat and backrest cushions 52, 53 and is provided with a selvage edge 62 which extends beyond the support ring. The selvage edge 62 is preferably secured to the main portion 32 of the inner support ring by means of staples 64 (FIG. 4) but other securing means, such as an adhesive, could be used.

The inner support ring 31, the seat and backrest cushions 52, 53, and the upholstery 61 comprise an integral subassembly which is mounted onto the seat pan 21 by the mounting means 71. The mounting means 71 for securing the above described subassembly includes the previously described lower and upper tabs 72, 73 and the lower and upper lances 74, 75, the bosses 43 and a releasable fastening means 77 in the form of threaded cap screws.

To assemble the seat, a channel shaped finish strip or trim bead 63, 163, 263 or 363 is first placed around the contoured edge 26 of the seat pan 21 and then the subassembly, comprising the inner support ring 31, the seat and backrest cushions 52, 53, and the upholstery cover 61, is lowered onto seat pan 21. The lower and upper tabs 72, 73 contact the lower and upper lances 74, 75 which constitute guide means to index and locate the subassembly in precise alignment with the seat pan 21. As the subassembly is fully seated upon the seat pan, the selvage edge 62 and the finish strip 63, 163, 263 or 363 will be placed between the contoured edge 26 of the seat pan and the lock rim 33 of the inner support ring 31. The releasable fastening means 77 are then passed through suitable openings in the mounting recesses 27 in the seat pan 22 and threaded into the mounting bosses 43 to draw the subassembly downwardly and secure it against the seat pan thus securely locking and clamping the selvage edge 62 and finish strip 63, 163, 263, or 363 in place between edge 26 and lock rim 32. If finish strip 63 is used, this clamping action will cause strip 63 to have a gasket effect which is created when the strip is compressed against selvage edge 62. If any of the modified strips 163, 263 or 363 are used with their respective resilient gasket means 164, 264 or 364, the "gasket effect" of the finish strip will be improved to further minimize water penetration between the seat cushion 51 and seat pan 21 when it rains. The tabs 72, 73 and the angular relationship of the support ring main portion 32 relative to the inner surface 25 of the flange 24 will cause the subassembly to wedge tightly against the seat pan with the tab preventing any twisting or lateral movement of the subassembly relative to the seat pan.

When assembled, as shown in FIG. 2, the top peripheral portion 38 of the inner lock ring 31 flares in a generally vertical direction when the seat is in a normal installed position to provide a bolster for the outer margin of the seat backrest cushion adjacent thereto. In addition, the front peripheral portion 37 of the inner lock ring rim 31 flares in a generally horizontal direction when the seat is in a normally installed position to provide a bolster for reenforcing and supporting the outer margin of the seat cushion 52 that is adjacent thereto.

Figure 8:
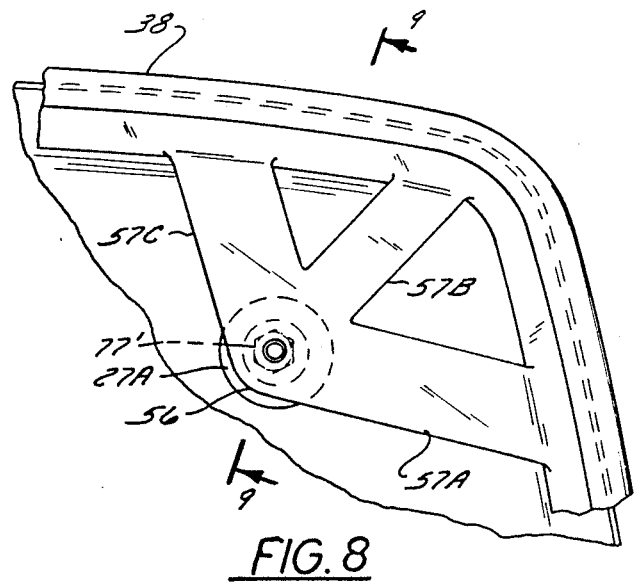
FIG. 8 is a partial elevational view of the upper right-hand corner of the backrest of the seat assembly showing a modified mounting means for securing the inner support ring to the seat pan.
Figure 9:
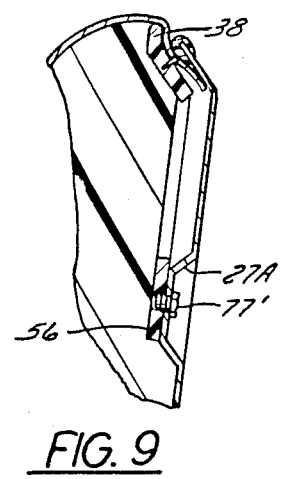
FIG. 9 is a sectional view taken along line 9—9 of FIG. 8.

In the second embodiment shown in FIGS. 8 and 9, the lower and upper tabs 72, 73 and the lower and upper tab guide means 74, 75 are eliminated and bosses 56, as shown in FIG. 8, substituted therefor. The structure of all the bosses adjacent the corners of the inner support ring is the same and therefore only one boss 56 is shown and described. The inner support ring 31 is provided with bosses 56 adjacent each corner of the front peripheral portion 37 of the inner ring 31 and adjacent each corner of the top peripheral portion 38 of the ring 31. Each boss 56 is mounted inwardly from the inner periphery of the support ring 31 by means of a strut structure 57a, 57b and 57c. While three strut members are shown, it would be practical to use only one or two struts for each boss.

The seat pan 21 is provided with mounting recesses 27a in opposed facing relation to each of the bosses 56. A cap screw 77' is passed through each of the mounting recesses 27a and threaded into the boss 56. The recess 27 could be eliminated and the cap screws 77' inserted through a flat seat pan bottom. The second embodiment also uses the mounting recesses 27, as shown in FIG. 2, adjacent the juncture of the seat 22 with the backrest 23.

From the foregoing description it will be understood that the second embodiment utilizes a total of six mounting recesses 27, 27a on the seat pan 21 and six corresponding bosses 43, 56 on the inner support ring 31. The inner support ring in all other respects is identical and will function in the same manner as does the support ring in the first embodiment disclosed in FIGS. 1–7.

Figure 11:
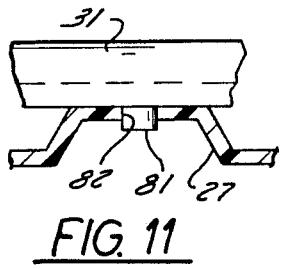
FIG. 11 is a partial sectional view showing a modification of the mounting means shown in FIG. 10.
Figure 10:
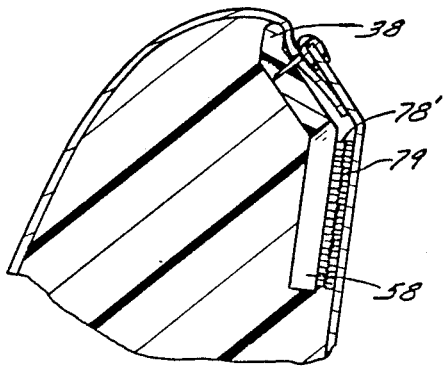
FIG. 10 is a partial sectional view of an upper portion of the backrest of the seat assembly showing another embodiment of the mounting means for securing the inner support ring to the seat pan.

FIG. 10 discloses a third embodiment which eliminates the use of either the lower and upper lances 72, 73 and the lower and upper lance guides 74, 75 as well as the mounting bosses 56 and associated mounting recesses 27a. In the third embodiment, the struts 57A, 57B, 57C and mounting bosses 56 are replaced by gussets 58. The hook portion 78' of a hook and loop fastener is either bonded or molded to the gusset 58. A corresponding loop fastener 79 is molded into o bonded to the seat pan 21 in opposed facing relation to the gussets 58. If desired, the mounting recesses 27 in the seat pan 21 can be retained and used as an aid to alignment during assembly. The alignment aid is shown in FIG. 11 and would include studs 81 molded into the inner support ring 31 which project from the mounting bosses into the apertures 82 of recesses 27, to index the subassembly to its proper place on the seat pan 21. The studs 81 are positioned and dimensioned to have a sliding fit into the apertures provided in the mounting recesses 27 of the seat pan.

It would also be possible to combine the various mounting arrangements shown and described in the three embodiments. For example, it would be possible to only use lower tabs 72 to align and index the front peripheral 37 of the support ring 31 and to use either mounting bosses and cap screws at the other locations or to use the hook and loop fastener system disclosed in FIG. 10. Further, it would be within the scope of the invention to bond the seat subassembly which comprises the seat and backrest cushions 52, 53, upholstery 61 and inner support ring 31 to the seat pan 21 by the use of an adhesive.

What is claimed is:

1. A seat assembly for use on a vehicle comprising:
   a seat pan (21) having
      seat and backrest portions (22, 23) having inward and outward facing sides,
      a flange (24) directed to extend at a first angle (A) toward said inward facing side and terminating in a contoured edge (26) to provide said seat pan inward facing side with a concave seat and backrest cushion receiving portion,
      said flange having an inner surface (25) adjacent said contoured edge, and
      an edge finishing means (63, 163, 263, 363) on said contoured edge of said seat pan,
   an inner support ring (31) on said inward facing side of said seat pan having
      a periphery (30) matching the contour of said contoured edge,
      a main portion (32) extending inwardly from said periphery, coextensively with and in spaced parallel relation to said inner surface of said flange,
      a lock rim portion (33) flaring outwardly at a second angle (B) toward said contoured edge,
      an interior surface (36)
      an outer surface (34) in facing relation to said seat pan inner surface (25),
      a seat front peripheral portion (37),
      a seat backrest top peripheral portion 38, and
      seat side peripheral portions (39, 41);

a mounting means (71) securing said inner support ring on said inward facing side of said seat pan;

seat and backrest cushion, means (51) having
central portions (52', 53') supported by said inward facing side of said seat pan and
an outer margin (54) secured to said interior surface (36) of said support ring; and an upholstery (61) covering said seat and backrest cushion means and having a selvage edge (62) extending beyond said cushion means, said selvage edge and said edge finishing means secured between said outer surface (34) of said lock rim portion of said support ring and said inner surface (25) of said flange so that forces on said outward facing side of said seat pan directed toward said support ring will further compress and secure said selvage edge between said lock rim portion and said flange and edge finishing means.

2. A seat assembly according to claim 1 wherein said mounting means (71) for securing said inner support ring to said seat pan includes
a plurality of tabs (72, 73) at spaced intervals along said periphery of said inner support ring extending inwardly toward said central back and seat supporting portions; and
a plurality of tab guide means (74, 75) on said seat pan seat and backrest portions, each of said guide means being in alignment with one of said tabs and cooperatively engageable therewith when said seat is assembled to align said inner support ring and associated seat and backrest cushion means on said seat pan.

3. A seat assembly according to claim 2 wherein said plurality includes two spaced apart tabs (72) on said inner support ring front peripheral portion (37) and two spaced apart tabs (73) on said inner support ring backrest top peripheral portion (38).

4. A seat assembly according to claim 1 wherein said mounting means includes a plurality of mounting bosses (43) on said inner support ring and releasable fastening means (77) extending through said seat pan and into said bosses.

5. A seat assembly according to claim wherein said plurality of bosses includes at least one mounting boss on each of said seat peripheral side portions (39) of said inner support ring.

6. A seat assembly according to claim 1 wherein said mounting means includes mounting bosses (56) on said front, top and side peripheral portions of said inner support ring and releasable fastening means (77') extending through said seat pan and into said bosses.

7. A seat assembly according to claim 1 wherein said lock rim top peripheral portion (38) is on said inward facing side of said seat pan and flares in a generally vertical direction in direct confronting relation to the edge finishing means adjacent thereto, when said seat is in an installed position, to provide a bolster for said outer margin of said backrest cushion adjacent thereto and wherein said lock rim front peripheral portion (37) is on said inward facing side of said seat pan and flares in a generally horizontal direction in direct confronting relation to the edge finishing means adjacent thereto when said seat is in an installed position to provide a bolster for said outer margin of said seat cushion that is adjacent thereto.

8. A seat assembly according to claim 7 wherein said lock rim bolster extends around said entire inner support ring periphery in face-to-face relation with said cushion means.

9. A seat assembly according to claim 1 wherein a hook and loop fastening means (78', 79) is secured between said seat pan inner surface and said support ring outer surface.

10. A seat assembly for use on a vehicle comprising:
a seat pan (21) having inward and outward facing sides, a flange (24) extending inward toward said inward facing side and a contoured edge (26) on said flange;
a channel shaped finishing strip (62) mounted on said contoured edge;
a seat and backrest cushion (51) supported by said seat pan inward facing side and having an outer margin (54);
an inner support ring (31) mounted on said outer margin of said cushion in face-to-face relation to said flange and having
a periphery (30) matching the contour of said contoured edge, and
a lock rim portion (32) extending outwardly from said cushion margin in overlying relation to said contoured edge;
an upholstery (61) covering said cushion and having a selvage edge (62) extending beyond said cushion to overlay said lock rim portion (33) and extending between said lock rim and said finishing strip; and
a mounting means (71) for securing said support ring (31) to said seat pan to clamp said selvage edge and finishing strip between said contoured edge and said lock rim so that forces on said outward facing side of said seat pan directed toward said support ring will further compress and secure said selvage edge between said lock rim portion and said flange and edge finishing means.

11. A seat assembly according to claim 1 wherein said channel shaped finish strip 63 is mounted on said contoured edge of said seat pan flange and has a gasket means (164, 264, 364) presenting a compression surface (166, 266, 366) in opposed facing relation to said lock rim portion (33) which is in a state of compression when said inner support ring, cushion and upholstery are assembled on said seat pan to resiliently urge said compression surface against said upholstery and lock rim.

12. A seat assembly according to claim 10 wherein said channel shaped finish strip 63 is mounted on said contoured edge of said seat pan flange and has a gasket means (164, 264, 364) presenting a compression surface (166, 266, 366) in opposed facing relation to said lock rim portion (33) which is in a state of compression when said inner support ring, cushion and upholstery are assembled on said seat pan to resiliently urge said compression surface against said upholstery and lock rim.

13. A seat assembly according to claim 11 wherein said finish strip is U-shaped in section and has an inner leg (165) presenting a compression surface (166) and an outer leg (167), and wherein said gasket means includes an air pocket (168) located internally of said inner leg which is compressed when said seat is assembled to resilient urge said compression surface (166) against said upholstery and lock rim.

14. A seat assembly according to claim 11 wherein said finish strip is U-shaped in section and has an inner leg (265) presenting a compression surface (266), and an outer leg (267) and wherein said inner leg includes dual low and high density foam portions (268, 269) with said gasket means comprising said low density foam portion (268) which is compressed when said seat is assembled to resiliently urge said compression surface against said upholstery and lock rim.

15. A seat assembly according to claim 11 wherein said finish strip is U-shaped in section and has an inner leg 365 presenting a compression surface (366) and an outer leg (367) and wherein said gasket means (364) comprises at least one resilient ridge (368) on said compression surface (366) which is compressed when said seat is assembled to resiliently urge said ridge against said upholstery and lock rim.

* * * * *